May 26, 1959

L. B. McMANIS 2,888,636

SIGNAL ATTENUATOR

Filed Feb. 26, 1957

EQUIVALENT CIRCUIT

INVENTOR
*Louis B. McManis*

BY
ATTORNEYS

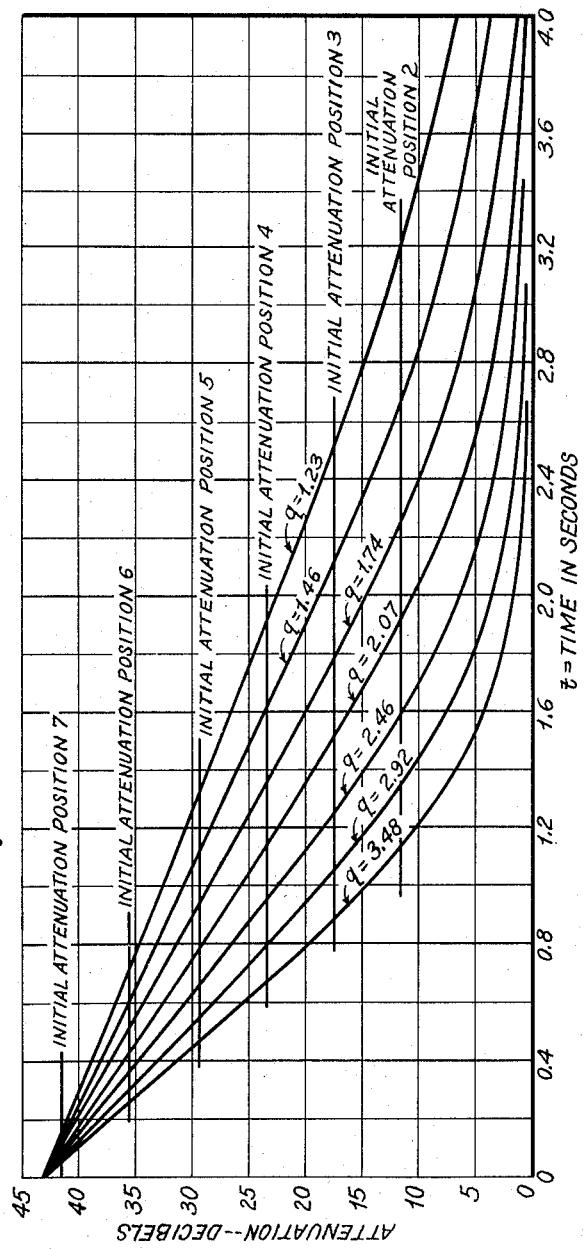

United States Patent Office 2,888,636
Patented May 26, 1959

2,888,636

SIGNAL ATTENUATOR

Louis B. McManis, Houston, Tex., assignor, by mesne assignments, to Dresser Industries, Inc., Dallas, Tex., a corporation of Delaware Application February 26, 1957, Serial No. 642,481

15 Claims. (Cl. 323—75)

This invention relates to a signal attenuator, and, more particularly, to an attenuator for geophone signals adapted to attenuate the signals initially to a selectable extent and then to attenuate the signals thereafter to a predictably decreasing extent.

One of the most useful methods of predicting the presence or absence of oil formations beneath the surface of the earth is that involving detonating a charge in a bore hole and detecting the resultant seismic signals at geophones spaced apart along the surface of the earth near the bore hole. This method requires careful interpretation of the amplitudes and times of occurrence of various signal levels of the geophone signals, but the first signals received at the geophone are ordinarily so much greater in magnitude than subsequent signals that some type of compression must be used in order to enable the signals to be recorded for subsequent analysis.

One of the earliest suggested solutions to this compression problem was the use of automatic gain control in the seismograph amplifier connected between the geophones and the recorder. The gain control responds to the output of the amplifier and functions to increase the gain of the amplifier continuously from a low value for first arrival of the geophone signals to a very much higher value for later signals. The gain control compresses all signals to approximately the same amplitude levels, and, since seismic signals may vary as much as 4000 to 1 in amplitude from the beginning of a signal to the end, an extreme amount of compression is involved.

One of the unfortunate attributes of automatic gain control in seismograph work is that one of the information parameters of the geophone signals, the amplitude characteristic, is discarded. Since amplitude comparison can be of great help to the interpreter of seismograph records, the loss of the amplitude parameter is a distinct disadvantage. Further, since the automatic gain control system controls the gain of the amplifier in accordance with the average signal level, its action is not instantaneous, so that, when a large signal is followed closely by a small amplitude signal, the gain of the amplifier is reduced to such a level that the small signal may not be detected.

Another consideration is the current wide spread use of magnetic recording in the seismic exploration art to permit various operations to be performed on the original seismic signals without destruction of the original signals. With such a method of recording available, it is desirable to be able to record the geophone signal frequencies in exactly the same amplitudes as they reach the geophone amplifier, but automatic gain control inherently will alter the frequency response of the amplifier, since the period of the automatic gain control circuit may be approximately the same as that of the low frequency signals.

Further, in certain basic research work with seismograph signals, measurements of the absolute amplitudes of the signals are necessary, and automatic gain control destroys this information, so that automatic gain control is unsatisfactory for such use.

The present invention, being directed to what might be termed a gain expansion or expander circuit, rather than automatic gain control, is designed to automatically increase the gain afforded the signals as a function of time after detonation of the charge. With such a system, the maximum and minimum values of the gain, as well as the rate of increase of the gain during the recording operation, can be adjusted. Actually, the gain of an amplifier is not affected, the expander merely being operable to furnish an attenuation to the signals which decreases with time.

Gain expanders are known to the art but these expanders generally operate with a variable-mu vacuum tube employing a bias derived from a charged condenser which is discharged through a resistor during the expansion period. Such a system, however, has a serious disadvantage because the characteristics of such vacuum tubes are neither stable nor alike among various tubes.

The patent to McManis et al., 2,663,002, issued December 15, 1953, discloses a gain expander which is an improvement on apparatus using variable-mu vacuum tubes, but with the apparatus of that patent it was not possible to determine exactly the amount of gain afforded any portion of the geophone signal, so that the amplitude information obliterated by the expander could not be replaced.

The present invention constitutes a further improvement on the gain expander principle and employs circuitry that functions to attenuate the signals in predictable manner, so that the amplitude information may be determined even after recording of the signal.

The apparatus of the invention, generally speaking, employs a thermionic diode bridge of the type disclosed in the aforementioned patent, but the capacitor legs of the bridge are substantially free of resistance, so that the discharge of the capacitors may be maintained at constant current, for purposes to be later explained.

The apparatus further includes a charge circuit for the bridge including a source of adjustable voltage which drives a very small current through the diodes and permits the capacitors to charge up to the diode voltage drops, and a second circuit which drives a constant current through the capacitors to discharge them at a constant rate and thereby to increase the shunting diode resistances in predictable manner. The diodes are caused to operate in both circuits in the thermionic emission portions of their characteristics.

The invention will now be more fully described in conjunction with a preferred embodiment thereof shown in the accompanying drawings.

In the drawings:

Fig. 3 is a graph showing various attenuation characteristics of a particular attenuator design for different selected values of the control parameters.

Figure 1:
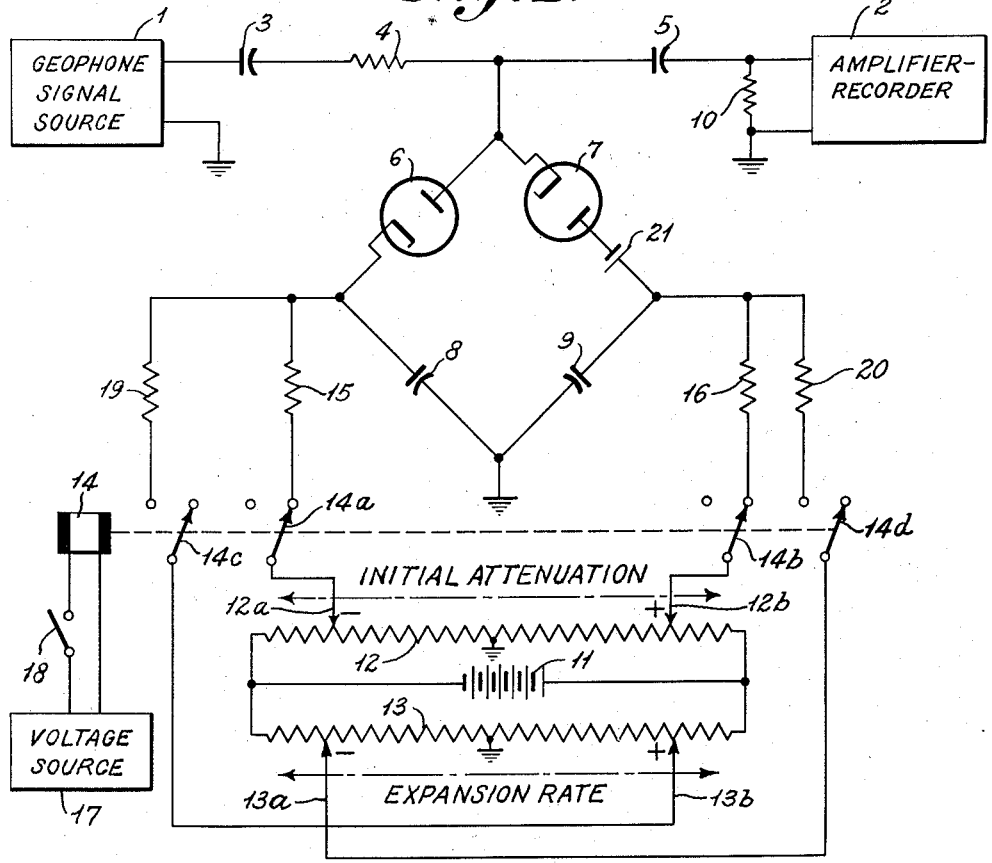
Fig. 1 is a schematic diagram of the attenuator or gain expander of the invention connected between a geophone signal source and a recorder.

Referring first to Fig. 1, the attenuator or gain expander is designed to be connected in a channel between a geophone signal source generally indicated at 1 and an amplifier-recorder, generally indicated at 2. The recorder may be of the magnetic type and the amplifier may be connected between the attenuator or expander and the recorder section.

One side of the geophone signal source is grounded, while the other side is connected through the series combination of a capacitor 3, a resistor 4 and a capacitor 5 to one side of the input of the amplifier-recorder. The other side of the amplifier-recorder is grounded.

The attenuator bridge includes a pair of thermionic diodes 6 and 7 connected in series with their junction connected to the connection between resistor 4 and capacitor 5. Connected across the series combination of the diodes are a pair of capacitors 8 and 9. It will be evident that the diodes form two arms of the bridge and the capacitors form the other two arms. The junction between the capacitors is connected to ground, so that the diode bridge forms a shunt circuit for the geophone signal channel. The signals from the source, as modified by the diode bridge, may be developed across a resistor 10 connected across the input to amplifier-recorder 2.

Figure 2:
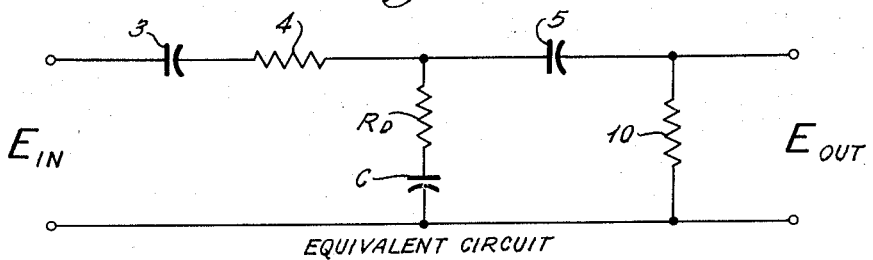
Fig. 2 is a schematic diagram of the equivalent circuit of the bridge of the attenuator.

Referring now to Fig. 2, the equivalent circuit of the bridge and elements connected thereto includes a resistance $R_D$ and a capacitance C connected in shunt to the geophone signal channel. The capacitance remains constant during the recording signal, but the resistance $R_D$, furnished by the parallel resistances of the two diodes 6 and 7, is caused to vary by the apparatus to be described. The resistance $R_D$ is caused to increase exponentially from a relatively low value, which causes substantial shunting of the geophone signal, to a high value. This exponential rate corresponds generally to the change in amplitude of the seismic signals reaching the geophones, with increasing time, and the exponential rate can be modified so as to compensate substantially exactly for the decreasing amplitude of the signals.

In the prior aforementioned patent, the features of operation of the diodes in the electron initial velocity region of their characteristics have been described. It is known that when the diodes are operated with a very small positive or small negative anode-cathode drop, the current through the diodes is determined by the initial velocity of the electrons emitted by the cathode and may be represented by the following equation:

$$I = I_s \frac{2}{\pi} \sqrt{\frac{eV}{kT}} \epsilon^{-\frac{eV}{kT}}$$

wherein I equals the D.-C. diode current, $I_s$ equals the saturation current; e equals the charge on an electron, V equals the plate-cathode voltage, k equals Boltzmann's constant, T equals the absolute temperature, and $\epsilon$ equals 2.71828. It will be seen that variation of diode current is exponential and it is known that variation is independent of tube construction and processing. By mathematical operations on this formula, the dynamic resistance of a diode operating in this region of its characteristics may be shown to be a function of a constant dependent upon temperature and the current flowing through the diode. Since temperature can be maintained substantially constant with relative ease, the dynamic resistance is determined substantially only by the current and is inversely proportional thereto.

Though the plate current-plate voltage characteristics of different thermionic diodes may be displaced from each other, if the current through any two diodes is the same, their dynamic resistances must be equal, as explained above. With the apparatus of Fig. 1, including capacitors 8 and 9, and 3 and 5, all the current that flows through one diode must flow through the other, so their dynamic resistances are equal. The dynamic resistances, therefore, can be made a function only of the magnitude of the voltage source in the diode circuit and the resistance of that circuit. The capacitors are selected so that their reactances are small at signal frequencies.

The apparatus now to be described accomplishes these desirable purposes of making the current through the diodes dependent only on the value of the terminal voltage of the source for the initial attenuation condition and then decreasing the current through the diodes in selectable exponential fashion so as to derive a simple exponential, but selectable, increase in the dynamic resistance $R_D$ of the diodes.

The circuits connected to the diode bridge include a charge circuit and an expansion circuit. The ultimate source of voltage for each circuit is a battery 11, which has a pair of tapped resistors 12 and 13 connected across its terminals. The midpoints of these resistors are grounded. Movable contacts 12a and 12b are provided for resistor 12, while resistor 13 has movable contacts 13a and 13b. As indicated in the drawing, the contacts 12a and 12b are ganged together, as are the contacts 13a and 13b, with the contacts equally spaced from their midpoints. Contact 12a is connected through one movable contact 14a of a quadruple-pole double-throw relay 14 and a resistor 15 to the junction between capacitor 8 and diode 6 when the relay is in its unenergized condition. The contact 12b is connected through movable contact 14b and resistor 16 to the terminal of the bridge between diode 7 and capacitor 9 when the relay 14 is not energized.

The resistors 15 and 16 are selected to be of equal value, because of the two equal portions of resistors 12 and 13 provided by the ground connection. The diodes are operated in the electron initial velocity regions of their characteristics. The voltage between contacts 12a and 12b is always so much greater than the diode voltage drops that the current through the diodes is substantially constant and equal to the total current drawn from the voltage source after the capacitors 8 and 9 charge up to the diode voltages. When the relay 14 is not energized, it will be evident that the capacitors will charge to the sum of the voltage drops across the diodes. However, the voltage across C8 and C9 will be equal, but the potential at the junction of R4 and C5 may not be zero because the diodes 6 and 7 may have different static characteristics.

Relay 14 is adapted to be energized from a voltage source 17 of any conventional type through a switch 18. Actually, the geophone signal itself may operate to energize relay 14 to change it to its energized condition when the first high amplitude geophone signal is received. Movable contacts 14a and 14b of the relay are inoperative when the relay is energized but contact 14c then connects movable contact 13b of tapped resistor 13 through a resistor 19 to the junction between diode 6 and capacitor 8. At the same time movable contact 14d connects movable contact 13a through resistor 20 to the opposite terminal of the bridge.

It will be noted that the voltage supplied the bridge is now of opposite polarity from that supplied when the relay is open. The voltage between movable contacts 13a and 13b of resistor 13 is always so much greater than the voltages across the capacitors 8 and 9 when they are charged to the diode voltages that the current through the capacitors with the relay operated remains relatively constant despite discharge of the capacitors until the capacitors have charged up to a substantial portion of the voltage between the movable contacts. This period may be made at least as long as the normal period of geophone signal recording.

During this period of constant current through the capacitors 8 and 9, the incremental voltage with respect to time (de/dt), being proportional to the current, will be constant. Since the diodes are operated in the exponential region of their characteristics, and since the voltage across them varies linearly with respect to time, the current through the diodes will vary exponentially with respect to time. Thus, the dynamic or incremental resistances of the diodes varies exponentially will respect to time. Because the capacitors are being discharged during this expansion operation, the voltages across them are decreasing, so that the diode current decreases. The diode incremental resistances, being inversely proportional to current through them, increases. The rate of decrease of the diode current, and, hence, of the increase in dynamic resistance, is determined by the magnitude of voltage between contacts 13a and 13b.

With the apparatus of Fig. 1, an operator may select the magnitude of initial attenuation for the geophone signal by moving ganged contacts 12a and 12b, the initial attenuation control. This value may be selected in accordance with the known characteristics of the area being investigated. The operator may further select the expansion rate, or the rate of increase of the dynamic resistance of the diodes $R_D$ by adjustment of ganged contacts 13a and 13b, constituting the expansion rate control. This adjustment may also be made in accordance with the known characteristics of the area, and particularly the rate of decrease of signal amplitude likely to be expected in that area.

In practical use of the apparatus of Fig. 1, the tapped resistors 12 and 13 may be stepped in discrete values, so that the operator can select any desired values of initial attenuation and expansion rate. A practical range of initial attenuation is from 18 db to 40 db, and the range of the expansion rate may be 50 db per second to 10 db per second. One suitable design might have the following values of the components:

| | |
|---|---|
| $R_{15}$—$R_{16}$ | 1 megohm. |
| $R_{19}$—$R_{20}$ | 10 megohms. |
| $C_8$—$C_9$ | 50 microfarads. |
| $C_3$—$C_5$ | 0.5 microfarads. |
| $R_4$ | 2 megohms. |
| $R_{10}$ | 1 megohm. |
| $E_{11}$ | 90 volts. |

It will be noted that the capacitance values for capacitors 8 and 9 are quite large. This is because it is desirable to provide for very low phase shift for even very low frequency signals, and the phase shift angle is inversely proportional to the capacitance. Such high capacitance requires electrolytic capacitors which are noted for their rather low leakage resistance. As indicated above, it is extremely important that, in the initial attenuation condition, all the bridge current flow through the diodes. If appreciable current flowed through the leakage resistance of the capacitors, the actual attenuation would be different from that expected with the setting of the movable contacts on resistor 12.

This problem, and the problem of providing for constant diode current at low initial attenuation levels despite instability of large resistors, were solved by providing a bias battery 21 in series with the diodes and poled to bias the diode anodes negatively. A 1.5 volt cell is sufficient to partially cancel out and many times does actually cancel out the average emission voltage. Also this 1.5 volt cell reduces the voltage across capacitors 8 and 9. Hence, the leakage current through the capacitors is reduced to a negligible amount. Tests with this circuit indicated actual initial attenuation to be almost exactly the same as calculated initial attenuation.

Fig. 3 is a plot of a series of theoretical attenuation curves for the circuit of Fig. 1, using the component values listed above. It will be noted that the different curves are for different values of "$q$," which are obtained by changing the position of the expansion rate control. The equation given in the figure may be obtained mathematically from the conventional attenuation relation, using the equation given above for the diode current and its indicated relationship to diode incremental resistance.

The plot of Fig. 3 also shows the initial attenuation for various settings of the corresponding control. The value "$q$" for the curves is obtained from the equation:

$$q = \frac{E_2}{R_{19}} \cdot \frac{1}{C_8} \cdot \frac{e}{kT}$$

where $E_2$ is the voltage between tap 13$_a$ and ground. The quantity $I_0^{max.}$ in the equation is the largest practical value for the diode current and is 10.5 microamperes.

To illustrate the use of these curves, an example will be given. Suppose that the initial attenuation control is set to position 6 and the expansion rate control set to give a value of $q$ of 1.74. Then the initial attenuation will be at the intersection of the $q$ eqauls 1.74 curve and the initial attenuation position 6 line, which is 35.5 db. This point occurs at .54 second on the time scale. However, the initial attenuation occurs at $t$ equals 0, by definition. Hence, the time scale must be shifted to the right by .54 second. Now assume that it is desired to determine the attenuation at a time one second after the expander has started operating. To account for the shift in the time scale, .54 second must be added to the time desired of one second, or 1.54 seconds. The intersection of the $q$ equals 1.74 curve and $t$ equals 1.54 seconds gives 21 db attenuation which is the attenuation obtained for an expansion period of 1 second.

It will be evident that, with a minimum of operations by the operator (only setting the initial attenuation and expansion rate controls), the attenuator of the invention may be set to attenuate the geophone signal to correspond with the expected or known attenuation characteristics of the area. Thereby, the overall gain of the constant gain amplifier of the amplifier-recorder 2 and the attenuator may be set for a low initial value and a predictable exponential increase with increasing time.

It will be evident that the circuit described includes an initial attenuation circuit and an expansion circuit, in combination with a common bridge. Other types of initial attenuation circuits could be used with the bridge and the expansion circuit than the series combination of the potential source and resistances shown. Any current supply which would charge the capacitors with the polarity shown in Fig. 1 could be employed, and the potential driving that current could be obtained from any suitable source. Therefore, the invention is not to be considered limited to the specific initial attenuation circuit described, except where called for by the appended claims.

Obviously, many minor changes could be made in the apparatus herein described without departure from the scope of the invention. Therefore, the invention is not to be considered limited to the specific embodiment shown, but only by the scope of the appended claims.

I claim:

1. A signal attenuator comprising a bridge circuit including a pair of thermionic diodes connected in similarly-poled series relationship forming two arms of the bridge, a pair of capacitors connected in series across the series combination of the diodes and forming the other two arms of the bridge, the signal being adapted to be connected across the diagonal of the bridge between the junction of the diodes and the junction of the capacitors, a series circuit including a source of constant potential and resistance means connected across the other diagonal of the bridge, the capacitor arms of the bridge being substantially free of static resistance so that appreciable current flows only through the diodes in said circuit when the capacitors are fully charged, the terminal voltage of said source being very much greater than the voltage drop across each of said diodes, so that the current through the diodes is substantially unaffected by the diode characteristics, the diodes being operated in the electron initial velocity region of their plate voltage-plate current characteristics and at substantially the same temperature, whereby the shunting resistance of the bridge circuit to a signal is dependent only on the current through the diodes.

2. The apparatus of claim 1 in which said source is of selectable terminal voltage so as to permit selection of the current through the diodes and hence of the shunting resistance of the bridge circuit.

3. A signal attenuator comprising a bridge circuit including a pair of thermionic diodes connected in similarly-poled relationship forming two arms of the bridge, a pair of capacitors connected in series across the series combination of the diodes and forming the other two arms of the bridge, the signal being adapted to be connected across the diagonal of the bridge between the junction of the diodes and the junction of the capacitors, a series circuit including a source of constant potential and resistance means connected across the other diagonal of the bridge, the resistance of said resistance means being so large that the diodes operate in the electron initial velocity region of their characteristics, the capacitor arms of the bridge being substantially free of resistance so that appreciable current flows only through the diodes in said circuit when the capacitors are fully charged, the terminal voltage of said source being so much greater than the voltage drop across each of said diodes that the current through the diodes is substantially independent of the characteristics of the diodes and determined only by the magnitude of the terminal voltage of the source and the resistance of said resistance means, and the diodes being operated at substantially the same temperature.

4. The apparatus of claim 3 in which said source is of selectable terminal voltage so as to permit selection of the current through the diodes and hence of the shunting resistance of the bridge circuit.

5. The apparatus of claim 3 including a second source of voltage connected in the bridge circuit in series with the diodes and poled to bias the diode anodes negatively, the terminal voltage of said second source being very much lower than the terminal voltage of said first-mentioned source.

6. A signal attenuator comprising a bridge circuit including a pair of thermionic diodes connected in similarly-poled series relationship forming two arms of the bridge, a pair of capacitors connected in series across the series combination of the diodes and forming the other two arms of the bridge, the signal being adapted to be connected across the diagonal of the bridge between the junction of the diodes and the junction of the capacitors, a first series circuit including a source of constant potential and resistance means connectable across the other diagonal of the bridge with the source poled so that the anode-cathode drops of the diodes are negative and the diodes operate in the electron initial velocity region of their characteristics, the capacitor arms of the bridge being substantially free of resistance so that appreciable current flows only through the diodes in said first circuit when the capacitors are fully charged, the terminal voltage of said source being so much greater than the voltage drop across each of said diodes that the current through the diodes is substantially independent of the particular diodes used and is determined only by the magnitude of the terminal voltage of the souce and the resistance of said resistance means in the first circuit, a second series circuit including said source of constant potential and said resistance means connectable after connection of said first circuit across said other diagonal of the bridge with the source oppositely poled with respect to the diodes in comparison with the first circuit, said source of potential in the second circuit being so much greater than the voltage across said capacitors when charged by the first circuit that the current through the capacitors when the second circuit is connected to the bridge is substantially constant for a substantial interval of time after the capacitors begin to discharge, and the diodes being operated at the same temperature, whereby the shunting effect of the bridge when the first circuit is connected may be of one value and may increase exponentially with time after the second circuit is connected to the bridge.

7. A signal attenuator comprising a bridge circuit including a pair of thermionic diodes connected in similarly-poled series relationship forming two arms of the bridge, a pair of capacitors connected in series across the series combination of the diodes and forming the other two arms of the bridge, the signal being adapted to be connected across the diagonal of the bridge between the junction of the diodes and the junction of the capacitors, a first series circuit including a first source of constant potential and first resistance means connectable across the other diagonal of the bridge with the source poled so that the anode-cathode drops of the diodes are negative and the diodes operate in the electron initial velocity region of their characteristics, the capacitor arms of the bridge being subtsantially free of resistance so that appreciable current flows only through the diodes in said first circuit when the capacitors are fully charged, the terminal voltage of said first source being so much greater than the voltage drop across each of said diodes that the current through the diodes in the first circuit is substantially independent of the particular diodes used and is determined only by the magnitude of the terminal voltage of the first source and the resistance of said first resistance means, a second series circuit including a second source of constant potential and second resistance means connectable across said other diagonal of the bridge with the second source oppositely poled with respect to the diodes in comparison with the poling of the first source in the first circuit, said second source of potential being so much greater than the voltage across said capacitors when charged by the first circuit that the current through the capacitors when the second circuit is connected to the bridge is substantially constant for a substantial interval of time after the capacitors begin to discharge, and means for selectively connecting the first and the second circuit to the bridge.

8. The apparatus of claim 7 in which said first and second sources are both of selectable terminal voltage so as to permit selection of the current through the diodes.

9. For use with a geophone signal recorder for recording signals delivered by a channel from the signal source to the recorder, an attenuator comprising a bridge circuit including a pair of thermionic diodes connected in similarly-poled series relationship forming two arms of the bridge, a pair of capacitors connected in series across the series combination of the diodes and forming the other two arms of the bridge, the signal source being adapted to be connected across the diagonal of the bridge between the junction of the diodes and the junction of the capacitors, a source of constant voltage, a pair of tapped resistors each connected across the source of voltage and each having a pair of movable contacts so that a predetermined portion of the terminal voltage of the source may be developed between each pair of movable contacts, a first series circuit including the portion of a first of said tapped resistors between the movable contacts and first resistance means connectable across the other diagonal of the bridge in such fashion that the voltage across said first tapped resistor is poled so that the anode-cathode drops of the diodes are negative and the diodes operate in the electron initial velocity region of their characteristics, the capacitor arms of the bridge being substantially free of resistance so that appreciable current flows only through the diodes in said first circuit when the capacitors are fully charged, the voltage between the movable contacts of said first tapped resistor being so much greater than the voltage drop across each of said diodes that the current through the diodes in the first circuit is substantially independent of the particular diodes used and is determined only by the magnitude of that voltage and the resistance of said first resistance means, a second series circuit including the portion of the second tapped resistor between its movable contacts and second resistance means connectable across said other diagonal of the bridge in such fashion that the voltage between the movable contacts of the second tapped resistor is oppositely poled with respect to the diodes in comparison with the poling of the voltage between the movable contacts of the first resistor, the voltage between the movable contacts of said second resistor being so much greater than the voltage across said capacitors when charged by current in the first circuit that the current through the capacitors when the second circuit is connected to the bridge is substantially constant for a substantial interval of time after the capacitors begin to discharge, and means for sequentially connecting the first and the second circuit to the bridge, whereby the settings of the movable contacts of the first tapped resistor determine the initial attenuation of the signal connected across the first-mentioned diagonal, and the setting of the movable contacts of the second tapped resistor determines the speed of decrease of the attenuation of the signal.

10. A signal attenuator comprising a bridge circuit including a pair of thermionic diodes connected in similarly-poled series relationship forming two arms of the bridge, a pair of capacitors connected in series across the series combination of the diodes and forming the other two arms of the bridge, the signal being adapted to be connected across the diagonal of the bridge between the junction of the diodes and the junction of the capacitors, means connectable across the other diagonal of the bridge for supplying current through the capacitors and the diodes in such direction as to charge the capacitors with negative side of one capacitor connected to the cathode of one of the diodes and positive side of the other capacitor connected to the anode of the other diode, a series circuit including a source of constant potential and resistance means connectable after connection of said current-supplying means across said other diagonal of the bridge with the source oppositely poled with respect to the charge on the capacitors from the current from said current-supplying means, said source being of so much greater potential than the voltage across said capacitors when so charged that the current through the capacitors is substanitally constant for a substantial interval of time after the capacitors begin to discharge, and the diodes being operated at the same temperature, whereby the shunting effect of the bridge when said current-supplying means is connected thereto may be of one value and may increase exponentially with time after the series circuit is connected to the bridge.

11. The apparatus of claim 10 including switch means operable in one condition to connect said current-supplying means to said bridge and in another condition to connect said series circuit to the bridge.

12. A signal attenuator comprising a bridge circuit including a pair of diodes connected in similarly-poled series relationship forming two arms of the bridge, a pair of capacitors connected in series across the series combination of the diodes and forming the other two arms of the bridge, the signal being adapted to be connected across the diagonal of the bridge between the junction of the diodes and the junction of the capacitors, a source of voltage for supplying substantially constant current substantially independent of the diode characteristics connected across the other diagonal of the bridge, the circuit being constructed such that the diodes of said bridge operate in the initial electron velocity region of their characteristics, whereby the shunting resistance of the bridge circuit to a signal is dependent only on the current through the diodes.

13. The apparatus of claim 12 including a second source of voltage connected in the bridge circuit in series with the diodes and poled to bias the diode anodes negatively.

14. A signal attenuator comprising a bridge circuit including a pair of diodes connected in similarly-poled series relationship forming two arms of the bridge, a pair of capacitors connected in series across the series combination of the diodes and forming the other two arms of the bridge, the signal being adapted to be connected across the diagonal of the bridge between the junction of the diodes and the junction of the capacitors, a first source of voltage for supplying substantially constant current substantially independent of the diode characteristics connected across the other diagonal of the bridge, and pressing to said diodes a bias voltage such that they operate in the electron initial velocity region of their characteristics, a second source of voltage connectable across said other diagonal of the bridge in opposite polarity to said first source of voltage upon disconnection of said first source of voltage, the potential of said second source of voltage being sufficiently great that the current through the capacitors is constant for a short interval of time following the connection of said second source, whereby the shunting effect of the bridge after said second source is connected decreases exponentially with time.

15. The apparatus of claim 14 including a second source of voltage connected in the bridge circuit in series with the diodes and poled to bias the diode anodes negatively.

References Cited in the file of this patent

UNITED STATES PATENTS

| 2,285,044 | Morris | June 2, 1942 |
| 2,329,558 | Scherbatskoy | Sept. 14, 1943 |